Sept. 3, 1946.  J. H. BOICEY  2,406,939
LAMINATED GLASS GLAZING UNIT
Filed Jan. 27, 1942

Inventor
JAMES H. BOICEY.
By Frank Fraser
Attorney

Patented Sept. 3, 1946

2,406,939

UNITED STATES PATENT OFFICE 2,406,939

LAMINATED GLASS GLAZING UNIT

James H. Boicey, Toledo, Ohio, assignor to Libbey-Owens-Ford Glass Company, Toledo, Ohio, a corporation of Ohio Application January 27, 1942, Serial No. 428,382

2 Claims. (Cl. 20—56)

The present invention relates to laminated glass glazing units and to the mounting thereof.

Although the laminated glass glazing units of this invention are not restricted to any particular use, they have been primarily designed for and are of especial utility in glazing the windshield and/or window openings in airplanes and other aircraft.

An object of the invention is to provide an improved type of laminated glass glazing unit and means for mounting two of such units in edge to edge relation in such a manner that the units will be effectively secured together and at the same time permitted to move or yield relative to one another without disturbing the connection therebetween.

Another object of the invention is to provide an improved laminated glass glazing unit including two sheets or plates of glass and an interposed layer of thermoplastic adherent thereto, with the plastic interlayer extending beyond the edges of the glass sheets to provide a flexible attaching flange, and being further characterized by the fact that the attaching flange is offset with respect to the center of the plastic interlayer so that, when two of the glazing units are associated with one another in edge to edge relation, the respective attaching flanges overlap one another in such a way that the outer surfaces of the two units will be in alignment or flush with one another.

A further object of the invention is to provide an improved laminated glass glazing unit of the above character, either flat or curved, which carries as a permanent and integral part of its whole a metal reinforcing member embedded in the extended portion of the plastic interlayer and projecting inwardly of the edges of the glass sheets to provide a metal-plastic attaching flange for receiving therethrough the means for securing two of the units together in edge to edge relation.

Other objects and advantages of the invention will become more apparent during the course of the following description, when taken in connection with the accompanying drawing.

In the drawing, wherein like numerals are employed to designate like parts throughout the same:

Figure 1:
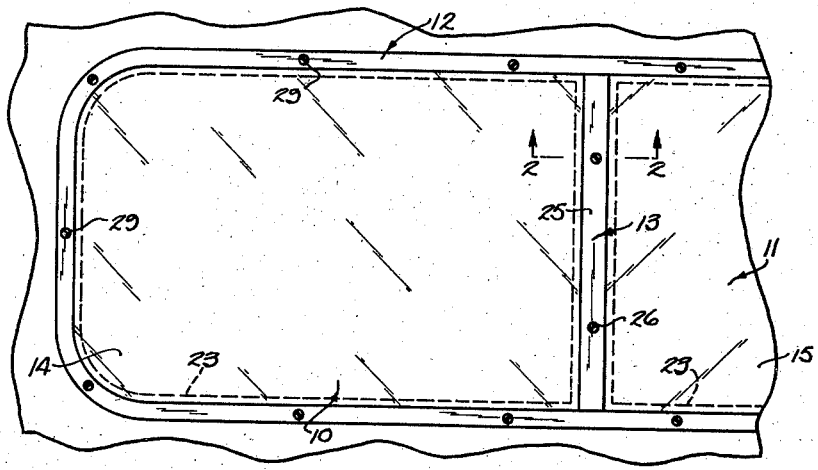
Fig. 1 is a plan view of two laminated glass glazing units provided by the invention and mounted in edge to edge relation.
Figure 2:
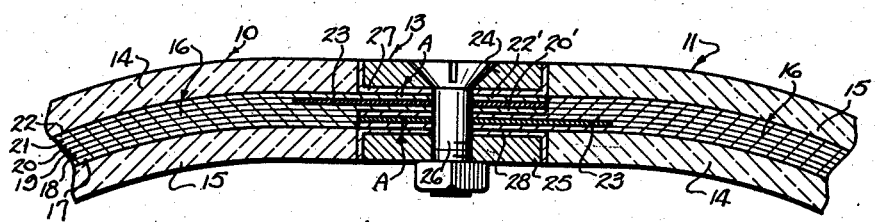
Fig. 2 is a horizontal section taken substantially on line 2—2 of Fig. 1.
Figure 3:
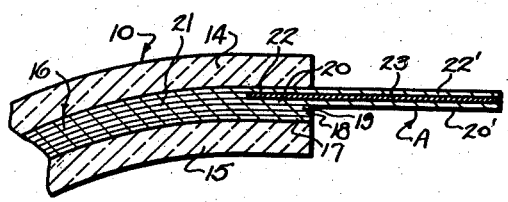
Fig. 3 is a transverse section through an edge portion of one of the units.

With reference now to the drawing and particularly to Figs. 1 to 3, there is disclosed a windshield or window construction comprising two transparent panels 10 and 11 mounted in edge to edge relation in a supporting frame 12 and secured to one another at their adjacent edges by a glazing bar or post 13. Each transparent panel 10 and 11 consists of a laminated glass unit comprising two sheets of glass 14 and 15 and a thermoplastic interlayer 16 interposed therebetween and bonded thereto to provide a unitary structure.

The glass sheets 14 and 15 may consist of ordinary plate or window glass and may also be either fully tempered or semi-tempered or any desired combination of glass sheets may be used. On the other hand, the plastic interlayer 16 is preferably made up of a plurality and, as here shown, six relatively thin sheets of plastic 17 to 22, preferably formed of a polyvinyl acetal resin. One such resin which has been used is polyvinyl butyr acetal resin and this resin may be plasticized with from 15 to 30 parts dibutyl sebacate per 100 parts of resin by weight. However, different plastics varying in thickness and physical characteristics may be employed as the invention is not limited to the use of any particular resin, class of resins, cellulosic derivative or the like. Also, the thickness of the plastic sheets, as well as the number employed will depend upon how thick it is desired to make the plastic interlayer 16. When selecting the glass and plastic, consideration should be given to the particular use to which the finished unit is to be put, since in some installations, the unit will be subjected to greater stresses and strains and likewise to greater pressure differentials than the others.

It will be noted that the plastic sheets 17, 18 and 19 terminate flush with the edges of the glass sheets 14 and 15, while the plastic sheets 20 and 22 extend beyond the edges of the glass sheets as indicated at 20' and 22' respectively. Disposed between the extended portions 20' and 22' of the plastic sheets 20 and 22 is a reinforcing member 23 comprising a strip of relatively thin, preferably flexible, metal bonded to the plastic to form a composite metal-plastic attaching flange A. The metal reinforcing member 23 may be formed of steel, tin, aluminum, galvanized metal or the like and, while the thickness thereof may vary, it may be mentioned, by way of example, that when using aluminum the thickness thereof may be approximately .020 to .030 of an inch. The metal reinforcing member 23 also preferably projects inwardly of the edges of the glass sheets 14 and 15 as shown and, while the distance the metal extends inwardly may vary, for the average size light or pane a distance of approximately ¼ inch is suggested. Obviously, the plastic sheet 21 is relatively smaller than the glass sheets to compensate for the presence of the metal reinforcement 23. With the above described arrangement, it will be seen that the metal-plastic attaching flange A is offset with respect to the center of the plastic interlayer 23. That is to say, the attaching flange is closer to one sheet of glass than the other. In other words, the thickness of the attaching flange A is one-half the total thickness of the plastic interlayer 16 and is disposed immediately adjacent one of the glass sheets.

In mounting the two glazing units 10 and 11 in edge to edge relation in the supporting frame 12, the said units are reversely positioned so that the attaching flanges A thereof overlap one another as shown in Fig. 2, with the combined thickness of the two flanges equaling the over-all thickness of the plastic interlayers 16. With such an arrangement, the glass sheets of the two units will be in alignment and the outer surfaces of the outer glass sheets flush with one another.

After the units have been properly associated with one another, the overlapping attaching flanges A are secured together by the glazing bar or post 13. This bar comprises outer and inner clamping strips 24 and 25 positioned at opposite sides of the attaching flanges and secured together by bolts or other suitable fastening elements 26 which pass through the said flanges. The clamping strips 24 and 25 are received between the glass sheets of adjacent units and, if desired, a layer of plastic material 27 may be disposed between the outer clamping strip 24 and the glazing units. A similar layer of plastic 28 may be disposed between the inner clamping strip 25 and glazing units. As illustrated in Fig. 2, the outer clamping strip 24 is arranged flush with the outer surfaces of the outer glass sheets of adjacent units, and this is of especial advantage in glazing airplanes and other aircraft as it gives a smooth, unbroken surface and serves to decrease wind resistance.

With such an arrangement, it will be seen that the two glazing units 10 and 11 are firmly yet yieldably secured to one another in such a manner that they will be permitted to move relative to one another upon being subjected to strain and stresses, as well as differences in pressure, without breaking the connection therebetween. It is also preferred that the plastic interlayer of each unit 10 and 11 be extended beyond the other edges of the glass sheets and the extended portion only secured in the supporting frame 12 by means of screws or the like 29 passing therethrough. This will give to the mounting a certain flexibility or resiliency so that any twisting or weaving of the plane will be taken up by the extended metal-plastic instead of being transmitted directly to the glass. Although it is preferred to provide the metal reinforcing members 23 for the extended portions of the plastic interlayers, the use of such metal reinforcement is not essential in all cases.

Figure 4:
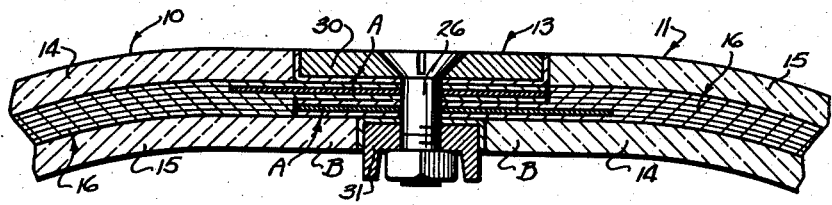
Fig. 4 is a view similar to Fig. 2 but showing a slightly modified type of unit.

In Fig. 4 is illustrated a windshield or window construction similar to that described above, with the exception that the inner glass sheets of the two glazing units 10 and 11 extend beyond the edges of the outer sheets as indicated at B to provide a so-called stepped arrangement. This also results in the outer clamping strip 30 of glazing bar 13 being relatively wider than the inner clamping strip 31. By making the inner glass sheets larger than the outer glass sheets so that the inner sheets overlap the outer clamping strip 30, a relatively stronger mounting is provided, in that there is less danger of shearing, tearing or stretching of the extended plastic when the unit is subjected to relatively high internal pressures such as is used in the pressurized cabins of airplanes. The type of structure shown in Fig. 4 is therefore of particular utility for use in glazing stratosphere planes in which pressurized cabins or other compartments are provided to obviate the necessity for each occupant of the plane having an individual oxygen supply. Another application for this type of installation is in the turrets of airplanes, the installation affording maximum viewing area and minimum visual interference.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. A laminated glass glazing unit, comprising two sheets of glass and an interposed layer of thermoplastic bonded thereto to form a composite structure, said plastic interlayer being of greater area than either of the glass sheets and extending outwardly therebeyond to provide a flexible attaching flange that is of lesser thickness than and offset from the center of the main body of the plastic interlayer lying between the two glass sheets, and a metal reinforcing member carried by the said attaching flange, one of said glass sheets extending outwardly beyond the edge of the other glass sheet and terminating inwardly of the outer edge of the said offset attaching flange and cooperating with the attaching flange to provide a slot therebetween.

2. In a windshield or window construction, a pair of transparent panels mounted in edge to edge relation, each panel comprising outer and inner glass sheets and an interposed layer of thermoplastic adherent thereto, a portion of the plastic interlayer of each panel extending beyond one edge of the glass sheets to provide a flexible attaching flange, the thickness of said attaching flange being approximately one-half the thickness of the plastic interlayer and positioned immediately adjacent one of the glass sheets, the attaching flanges of the two panels overlapping one another to bring the outer glass sheets in alignment, the inner glass sheets of the abutting panels extending outwardly beyond the edges of the outer glass sheets to form a slot between one of said inner glass sheets and its offset interlayer within which the offset interlayer of the other panel is received, means for securing the overlapping attaching flanges together comprising clamping strips disposed at opposite sides thereof and fastening means passing through the said clamping strips and attaching flanges, the outer clamping strip being received between the edges of the outer glass sheets and lying with the outer surface flush with the outer surface of the glass sheets, and the inner clamping strip being received between the edges of the inner glass sheets, and a metal reinforcing member embedded in each attaching flange and projecting inwardly of the edges of the respective glass sheets.

JAMES H. BOICEY.